(12) United States Patent
Chene et al.

(10) Patent No.: US 6,516,251 B1
(45) Date of Patent: Feb. 4, 2003

(54) AUTOMATED VEHICLE SHUTDOWN SEQUENCE

(75) Inventors: George Chene, Sterling Heights, MI (US); Lee A. French, Sterling Heights, MI (US); Dennis A. Kramer, Troy, MI (US); Gerald D. Lawruk, Clarkston, MI (US); Brian Jeffrey Mueller, Lake Orion, MI (US); Reno V. Ramsey, Sterling Heights, MI (US); Wayne Shintaku, Auburn Hills, MI (US); Jack R. Worrall, Novi, MI (US)

(73) Assignee: Meritor Heavy Vehicle Technology, LLC., Troy, MI (US)

( * ) Notice: Subject to any disclaimer, the term of this patent is extended or adjusted under 35 U.S.C. 154(b) by 0 days.

(21) Appl. No.: 09/767,999

(22) Filed: Jan. 23, 2001

(51) Int. Cl.[7] .............................. G06F 3/02; G06F 7/00; B60R 25/10

(52) U.S. Cl. .............................. 701/1; 701/120; 701/35; 701/101; 701/102; 703/8; 703/22; 123/630; 123/643; 123/190 DC; 123/447; 123/467; 180/54.1; 455/432; 455/466; 340/426; 340/5.31; 73/49.7; 73/47

(58) Field of Search .............................. 701/1, 120, 35, 701/101, 102; 703/8, 22; 123/630, 643, 198 DC, 198 D, 198 DB, 179.4, 179.5, 447, 467; 180/54.1; 455/432, 466, 550, 419, 404; 340/426, 5.31, 5.33; 417/407; 415/114; 73/49.7, 47, 118.2; 303/89, 85, 1; 137/204, 203, 412; 188/352

(56) References Cited

U.S. PATENT DOCUMENTS

| 4,204,255 A | 5/1980 | Cremer |
| 4,404,641 A | 9/1983 | Bazarnik |
| 4,441,359 A | 4/1984 | Ezoe |

(List continued on next page.)

OTHER PUBLICATIONS

U.S. patent application and Drawings for "Personal Data Computer For Vehicle Monitoring", Ser. No. 09/591,970; Filed Jun. 12, 2000.

U.S. patent application and Drawings for "Individualized Vehicle Settings", Ser. No. 09/767,930; Filed Jan. 22, 2001.

U.S. patent application and Drawings for "Vehicle Systems Data Storage", Ser. No. 09/767,932; Filed Jan. 23, 2001.

U.S. patent application and Drawings for "Vehicle Driver Data", Ser. No. 09/850,455; Filed May 7, 2001.

U.S. patent application and Drawings for "Vehicle Data Display Device", Ser. No. 09/716,718; Filed Nov. 20, 2000.

U.S. patent application and Drawings for "Vehicle Inspection and Maintenance System", Filed on Aug. 8, 2001.

U.S. patent application and Drawings for "Smart Card System For Heavy Vehicles", Ser. No. 09/522,352; Filed Mar. 9, 2000.

*Primary Examiner*—William A. Cuchlinski, Jr.
*Assistant Examiner*—Ronnie Mancho
(74) *Attorney, Agent, or Firm*—Carlson, Gaskey & Olds

(57) ABSTRACT

The present invention provides a system for automatically shutting down a vehicle. The system includes a vehicle system for performing a vehicle function such as brakes for performing braking of the vehicle. A vehicle control system controls the vehicle system by controlling valve switches or actuators to manipulate the vehicle system. A portable handheld computing device includes a program defining a vehicle shutdown sequence. Preferably, the portable handheld computing device is what is known as a personal digital assistant (PDA), such as a Handspring® or Palmpilot®. A cradle removably receives the portable handheld computing device to connect the portable handheld computing device with the vehicle control system, such as through the vehicle databus. A switch enables the portable handheld computing device to command the vehicle control system to perform the vehicle shutdown sequence. The switch may be an ignition switch, a dedicated vehicle shutdown sequence switch, or an icon on a PDA display touch screen. Once the switch has been actuated, the program residing on the portable handheld computing device commands the vehicle control systems to perform the vehicle shutdown sequence. For example, the vehicle shutdown sequence may command the pneumatic power control system to purge a wet tank to remove the water from the wet tank to prevent it from rusting.

4 Claims, 1 Drawing Sheet

U.S. PATENT DOCUMENTS

| | | | |
|---|---|---|---|
| 4,477,874 A | 10/1984 | Ikuta et al. | |
| 4,533,900 A | 8/1985 | Muhlberger et al. | |
| 4,660,140 A | 4/1987 | Illg | |
| 4,707,788 A | 11/1987 | Tashiro et al. | |
| 4,731,769 A | 3/1988 | Schaefer et al. | |
| 4,739,482 A | 4/1988 | Wrigge | |
| 4,773,011 A | 9/1988 | VanHoose | |
| 4,787,041 A | 11/1988 | Yount | |
| 4,926,331 A | 5/1990 | Windle et al. | |
| 4,939,652 A | 7/1990 | Steiner | |
| 4,975,847 A | 12/1990 | Abe et al. | |
| 5,046,007 A | 9/1991 | McCrery | |
| 5,081,667 A * | 1/1992 | Drori et al. | 290/38 C |
| 5,091,856 A | 2/1992 | Hasegawa et al. | |
| 5,253,052 A | 10/1993 | Hanashiro et al. | |
| 5,365,436 A | 11/1994 | Schaller et al. | |
| 5,400,018 A | 3/1995 | Scholl et al. | |
| 5,435,422 A * | 7/1995 | Chille, Sr | 137/204 |
| 5,475,399 A | 12/1995 | Borsuk | |
| 5,479,347 A | 12/1995 | Oguro et al. | |
| 5,555,171 A | 9/1996 | Sonehara et al. | |
| 5,570,756 A * | 11/1996 | Hatcher | 180/287 |
| 5,584,493 A * | 12/1996 | Demski et al. | 105/445 |
| 5,660,334 A * | 8/1997 | Trusty et al. | 137/412 |
| 5,680,328 A | 10/1997 | Sorupski et al. | |
| 5,749,391 A * | 5/1998 | Loutzenhiser | 137/204 |
| 5,778,381 A | 7/1998 | Sandifer | |
| 5,787,373 A | 7/1998 | Migues | |
| 5,797,107 A | 8/1998 | Berg et al. | |
| 5,801,767 A | 9/1998 | Wu | |
| 5,812,399 A | 9/1998 | Judic et al. | |
| 5,848,365 A | 12/1998 | Coverdill | |
| 5,859,628 A | 1/1999 | Ross et al. | |
| 5,916,286 A | 6/1999 | Seashore et al. | |
| 5,931,878 A | 8/1999 | Chapin, Jr. | |
| 5,933,125 A | 8/1999 | Fernie et al. | |
| 5,948,026 A | 9/1999 | Beemer, II et al. | |
| 5,961,561 A | 10/1999 | Wakefield, II | |
| 5,964,813 A | 10/1999 | Ishii et al. | |
| 5,986,543 A * | 11/1999 | Johnson | 340/426 |
| 5,990,800 A * | 11/1999 | Tamaki et al. | 123/179.2 |
| 6,003,808 A | 12/1999 | Nguyen et al. | |
| 6,006,147 A | 12/1999 | Hall et al. | |
| 6,006,148 A | 12/1999 | Strong | |
| 6,009,363 A | 12/1999 | Beckert et al. | |
| 6,052,631 A | 4/2000 | Busch et al. | |
| 6,055,468 A | 4/2000 | Kaman et al. | |
| 6,073,063 A | 6/2000 | Leong Ong et al. | |
| 6,084,567 A | 7/2000 | Ogawa | |
| 6,104,971 A * | 8/2000 | Fackler | 701/33 |
| 6,182,006 B1 | 1/2001 | Meek | |
| 6,234,586 B1 * | 5/2001 | Davis et al. | 303/89 |
| 6,256,992 B1 * | 7/2001 | Lewis et al. | 60/603 |
| 6,272,904 B1 * | 8/2001 | Neely et al. | 73/118.2 |

* cited by examiner

AUTOMATED VEHICLE SHUTDOWN SEQUENCE

BACKGROUND OF THE INVENTION

This invention relates to an automated vehicle shutdown sequence, and more particularly, the invention relates to a automated vehicle shutdown sequence adapted for use with a portable handheld computing device.

Passenger vehicles have utilized automated vehicle shutdown sequences to perform particular functions within a vehicle control system once the vehicle has been turned off. For example, modem vehicles turn the headlights off after a predetermined time once the ignition switch has been turned off. Similarly, modem vehicles may set the parking brake once the ignition switch is turned off. These simple, independent shutdown sequences are permanently programmed into the vehicle control modules and are not capable of being modified. Since passenger vehicles are produced in very high volumes with relatively few vehicle options, the automated vehicle shutdown sequence can not be modified by the user.

By contrast, heavy duty vehicle trucks such as truck tractors are produced in low volumes and have a large number of system packages available. For example, a heavy duty truck will have numerous engine and transmission combinations as well as other vehicle systems, such as brake systems and trailer slider systems. As a result, it is very difficult to provide an automated vehicle shutdown sequence that will work for a large number of heavy duty trucks. Furthermore, different truck for a particular truck operators may desire different shutdown sequences. Accordingly, it is desirable to provide a user programmable automated shutdown sequence that may be tailored for a particular heavy duty vehicle truck combination. A user programmable automated vehicle shutdown sequence requires a plurality of inputs and a display for most convenient use to the user. It is common for heavy duty truck operators to use more than one truck. Therefore, it is desirable to provide a automated vehicle shutdown sequence that may be programmed by a particular truck user and taken from truck to truck.

SUMMARY OF THE INVENTION AND ADVANTAGES

The present invention provides a system for automatically shutting down a vehicle. The system includes a vehicle system for performing a vehicle function such as brakes for performing braking of the vehicle. A vehicle control system controls the vehicle system by controlling valve switches or actuators to manipulate the vehicle system. A portable handheld computing device includes a program defining a vehicle shutdown sequence. Preferably, the portable handheld computing device is what is known as a personal digital assistant (PDA), such as a Handspring® or Palmpilot®. A cradle removably receives the portable handheld computing device to connect the portable handheld computing device with the vehicle control system, such as through the vehicle databus. A switch enables the portable handheld computing device to command the vehicle control system to perform the vehicle shutdown sequence. The switch may be an ignition switch a dedicated vehicle shutdown sequence switch, or an icon on a PDA display touch screen. Once the switch has been actuated, the program residing on the portable handheld computing device commands the vehicle control systems to perform the vehicle shutdown sequence. For example, the vehicle shutdown sequence may command the pneumatic power control system to purge a wet tank to remove the water from the wet tank to prevent it from rusting.

Accordingly, the above invention provides a automated vehicle shutdown sequence that may be programmed by a particular truck user for a particular truck and taken from truck to truck.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
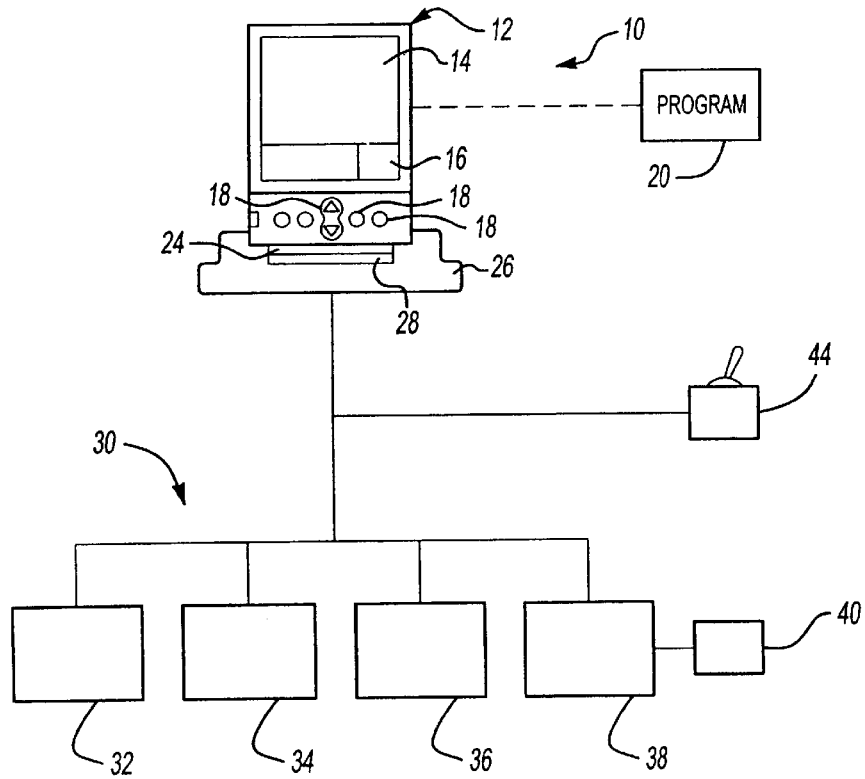
FIG. 1 is a schematic view of the system of the present invention.

A system 10 for automatically shutting down a vehicle is schematically shown in FIG. 1. The system 10 includes a portable handheld computing device 12, commonly referred to as a personal digital assistant (PDA), such as a Handspring® or Palmpilot® device. The PDA 12 includes a display screen 14 that includes a character input screen portion 16. The display screen 14 and input screen 16 are typically touch screens receiving inputs from the pressure of a stylus. The PDA 12 also includes input buttons 18 for receiving user inputs. A program 20 is resident in the memory of the PDA 12 and may be modified by using the character input screen 16 or input buttons 18. Additionally, the program 20 may be modified in another computing device and then transferred to the PDA 12.

The PDA 12 includes a dataport 24 for transmitting data to an external device. The vehicle preferably includes a cradle 26 or receptacle for receiving the PDA 12. The cradle 26 may include a vehicle dataport 28 that is in communication with the vehicle's databus. Once the PDA 12 is received within the cradle 26 the dataport 24 and vehicle dataport 28 are in communication with one another. However, it is to be understood that the PDA 12 may communicate with the vehicle in a manner other than using an electrical connection as described.

The vehicle includes a number of vehicle systems for performing various vehicle functions. As discussed above, the vehicle systems vary widely from heavy duty vehicle to heavy duty vehicle due to the numerous system combinations possible. Unlike passenger vehicles, heavy duty vehicles have numerous vehicle system options that may be requested by the purchaser so that the heavy duty vehicle may be best configured for the users needs. Each of the vehicle systems typically includes a vehicle control system for controlling the vehicle system. The vehicle control system typically include switches, valves, hardware, software, actuators, and other devices for controlling the vehicle system. A vehicle may include a single vehicle control system for controlling numerous dedicated vehicle systems or the vehicle may include numerous vehicle control systems. Because of the numerous heavy duty vehicle system options that are available, it may be more convenient for each vehicle system to include a vehicle control system of its own so that the vehicle system may be integrated into the heavy duty vehicle as a package. Representative vehicle control systems are a light control system 32 for controlling the vehicle's lights, a pneumatic power control system 34 for controlling pneumatic systems such as brakes and trailer sliders, a brake control system 36 for controlling the vehicles brakes, and engine control system 38 for controlling the various aspects of operation of the engine. The engine control system 38, like many other control systems may include sensors and other devices to better control the particular vehicle system. For example, the engine control system 38 may include a temperature sensor 40 for monitoring temperature of the engine turbo charger.

The system 10 also includes a switch 44 for enabling the PDA 12 to command the vehicle control systems to perform the vehicle shutdown sequence. The switch may be the vehicle ignition switch or a dedicated vehicle shutdown switch. The switch may also be an icon on the PDA display screen 14 that may be actuated by touching a portion indicated on the display screen 14.

The program 20 may command the light control system 32 to turn off the lights after a predetermined time, such as after several minutes. The pneumatic power system 34 includes a wet tank for collecting water that is produced in the pneumatic system. If the water is permitted to remain in the wet tank, the wet tank may rust and inhibit the proper operation of the pneumatic system. The program 20 may actuate a valve in the wet tank to purge the water from the wet tank, preferably for approximately 15 seconds. The program 20 may also actuate the parking brake through the brake control system 36 so that the heavy duty vehicle is safely secured in its parking space. The program 20 may also monitor the turbo charger temperature through sensor 40. Once the turbo charger temperature has safely cooled down to a predetermined turbocharger temperature, the program 20 may command the engine to turn off through the engine control system 38.

Figure 2:
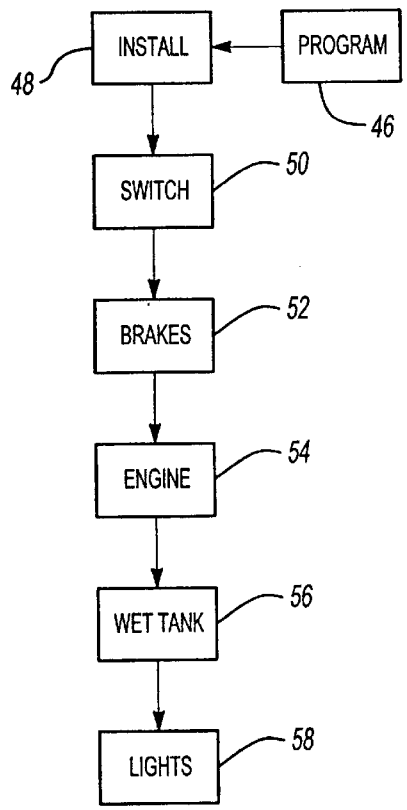
FIG. 2 is a block diagram of a preferred vehicle shutdown sequence of the present invention.

Referring to FIG. 2, the program 20 is resident in the memory of the PDA 12. As indicated by block 46. The PDA 12 is installed into the cradle 26 so that the PDA 12 may communicate with the vehicle dataport 28, as indicated by block 48. However, it is to be understood that the program 20 may be put into the memory of the PDA 12 subsequent to installation of the PDA 12 into the cradle 26. The switch 44 is actuated to permit the PDA 12 to communicate with the vehicle control systems, as indicated by block 50. The PDA 12 may communicate with one or more vehicle control systems. In the preferred embodiment of the invention, the program 20 commands the parking brake to be actuated, as indicated by block 52. Next the program 20 commands the engine to shutdown after the turbocharger has cooled to a predetermined turbocharger temperature, as indicated by block 54. Subsequently, the program 20 commands the wet tank to purge any water therein, as indicated by block 56. Finally, the program 20 commands the light control system to shut the lights off after a predetermined time, as indicated by block 58.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A system for automatically shutting down a vehicle comprising:
    a vehicle system for performing a vehicle function;
    a vehicle control system controlling said vehicle system;
    a portable handheld computing device including a program defining a vehicle shutdown sequence;
    a cradle removably receiving said portable handheld computing device to connect said portable handheld computing device with said vehicle control system;
    a switch enabling said portable handheld computing device to command said vehicle control system to perform said vehicle shutdown sequence; and
    wherein the system includes a wet tank and said vehicle control system is a pneumatic power control system, and said vehicle shutdown sequence includes purging said wet tank.

2. A system for automatically shutting down a vehicle comprising:
    a vehicle system for performing a vehicle function;
    a vehicle control system controlling said vehicle system;
    a portable handheld computing device including a program defining a vehicle shutdown sequence;
    a cradle removably receiving said portable handheld computing device to connect said portable handheld computing device with said vehicle control system;
    a switch enabling said portable handheld computing device to command said vehicle control system to perform said vehicle ,shutdown sequence; and
    wherein the system includes an engine with a turbocharger and said vehicle control system is an engine control system, and said vehicle shutdown sequence includes shutting down said engine at a predetermined turbocharger temperature.

3. A method of automatically shutting down a vehicle including a wet tank comprising the steps of:
    a) programming a vehicle shutdown sequence into a portable handheld computing device;
    b) installing the portable handheld computing device into a cradle;
    c) activating a switch to permit the portable handheld computing device to communicate with a pneumatic power control system; and
    d) commanding the pneumatic power control system with the portable handheld computing device to perform the vehicle shutdown sequence which includes purging the wet tank.

4. A method of automatically shutting down a vehicle including an engine with a turbocharger comprising the steps of:
    a) programming a vehicle shutdown sequence into a portable handheld computing device;
    b) installing the portable handheld computing device into a cradle;
    c) activating a switch to permit the portable handheld computing device to communicate with a engine control system; and
    d) commanding the vehicle control system with the portable handheld computing device to perform the vehicle shutdown sequence which includes shutting down the engine at a predetermined turbocharger temperature.

* * * * *